United States Patent
Billard

(10) Patent No.: US 11,723,310 B2
(45) Date of Patent: Aug. 15, 2023

(54) AGRICULTURAL MACHINE COMPRISING A SAFETY SYSTEM WITH IMPROVED TRIGGERING KINEMATICS

(71) Applicant: KUHN S.A., Saverne (FR)

(72) Inventor: Sylvain Billard, Reinhardsmunster (FR)

(73) Assignee: KUHN S.A., Saverne (FR)

( * ) Notice: Subject to any disclaimer, the term of this patent is extended or adjusted under 35 U.S.C. 154(b) by 529 days.

(21) Appl. No.: 16/765,667

(22) PCT Filed: Nov. 20, 2018

(86) PCT No.: PCT/EP2018/081906
§ 371 (c)(1),
(2) Date: May 20, 2020

(87) PCT Pub. No.: WO2019/101731
PCT Pub. Date: May 31, 2019

(65) Prior Publication Data
US 2020/0296889 A1    Sep. 24, 2020

(30) Foreign Application Priority Data

Nov. 21, 2017    (FR) ...................................... 1761010

(51) Int. Cl.
*A01D 34/66* (2006.01)
*A01D 75/18* (2006.01)
(Continued)

(52) U.S. Cl.
CPC ......... *A01D 75/185* (2013.01); *A01D 34/661* (2013.01); *A01D 34/664* (2013.01);
(Continued)

(58) Field of Classification Search
CPC .... A01B 61/00–048; A01B 59/00–069; A01B 63/00–32; A01D 34/661;
(Continued)

(56) References Cited

U.S. PATENT DOCUMENTS

| | | | |
|---|---|---|---|
| 3,462,923 A * | 8/1969 | Yeske | A01D 34/03 56/16.3 |
| 5,101,616 A | 4/1992 | Wolff | |

(Continued)

FOREIGN PATENT DOCUMENTS

| | | | |
|---|---|---|---|
| DE | 202014002808 U1 * | 8/2015 | ........... A01D 34/661 |
| EP | 0 451 074 A1 | 10/1991 | |

(Continued)

OTHER PUBLICATIONS

International Search Report dated Jan. 4, 2019 in PCT/EP2018/081906 filed Nov. 20, 2018, 2 pages.

*Primary Examiner* — Adam J Behrens
(74) *Attorney, Agent, or Firm* — Oblon, McClelland, Maier & Neustadt, L.L.P.

(57) ABSTRACT

An agricultural machine includes a hitching support, at least one tool or group of tools, at least one support arm which is connected to the hitching support by a first joint and to the tool or tool group, and which is mounted so as to pivot about a transfer axis between operational and raised positions, and a safety device making it possible to carry out a safety movement under the effect of pressure. The safety device includes a lift connected to the hitching support by a second joint. The second joint is offset relative to the first joint in the direction of travel. The safety movement can include a second movement phase during which the lift is able to move the tool or the group of tools away from the ground.

13 Claims, 7 Drawing Sheets

(51) Int. Cl.
*A01D 67/00* (2006.01)
*A01B 63/00* (2006.01)
*A01D 101/00* (2006.01)

(52) U.S. Cl.
CPC .............. *A01D 67/00* (2013.01); *A01B 63/00* (2013.01); *A01D 2101/00* (2013.01)

(58) Field of Classification Search
CPC .... A01D 34/66; A01D 34/664; A01D 34/665; A01D 34/828; A01D 2101/00; A01D 75/18; A01D 75/185
See application file for complete search history.

(56) References Cited

U.S. PATENT DOCUMENTS

| | | | | |
|---|---|---|---|---|
| 8,713,904 B1* | 5/2014 | Goudy | ................... | A01D 34/84 56/15.5 |
| 2015/0189831 A1* | 7/2015 | Wolff | ................... | A01D 34/661 56/255 |
| 2016/0255762 A1* | 9/2016 | Billard | ................... | A01D 34/66 |

FOREIGN PATENT DOCUMENTS

| | | |
|---|---|---|
| EP | 0 679 327 A1 | 11/1995 |
| EP | 2 189 053 A1 | 5/2010 |
| EP | 2 926 643 A1 | 10/2015 |
| FR | 2 384 431 A1 | 10/1978 |
| WO | WO 2015/075356 A1 | 5/2015 |

\* cited by examiner

AGRICULTURAL MACHINE COMPRISING A SAFETY SYSTEM WITH IMPROVED TRIGGERING KINEMATICS

The present invention relates to the field of mounted, drawn or pushed agricultural machines, particularly of the type that glide resting on the ground in the normal use, such as harvesting, mowing or plant-treatment machinery.

The invention relates more specifically to an agricultural machine of the type mentioned hereinabove with a safety system having improved triggering kinematics.

Whatever their exact nature, the agricultural machines to which the invention relates all have in common the fact that during work they normally travel in a direction of forward travel and that they each comprise:
  a hitching support,
  at least one tool or group of tools having, in the work position, an extension transverse to the direction of forward travel and projecting laterally with respect to the hitching support,
  at least one mounting arm connected to the hitching support via a first articulation, and to the tool or the group of tools considered, said mounting arm being mounted with the ability to pivot about an axis referred to as the transfer axis, substantially parallel to the plane of the ground when the machine is hitched, and about which the tool or the group of tools can be transferred alternately between a working position in which it at least partially rests on the ground and at least one raised position, in which it is distanced from the ground, and
  a safety device by means of which the tool or the group of tools considered can perform a safety movement under the effect of sufficient pressure exerted thereon in an opposite direction to the direction of forward travel, this safety movement comprising at least a first phase of movement of which at least one component is a rotation toward the rear, this being with respect to the direction of forward travel, and about the first articulation.

Specifically, when they are being used, these machines may strike a stone, a stump or a similar obstacle protruding from the ground and firmly set therein, possibly hidden by the plant matter. In order to avoid damage to the tool or the group of tools, to the hitching support and/or to the connections between these elements, as a result of a brutal impact, the safety device in the known way causes the tool or the group of tools to pivot toward the rear in order to absorb the shock, compensate for the forward travel of the machine with respect to the obstacle, and give said tool or group of tools more time to overcome the obstacle, by passing over it by sliding or after being raised.

Numerous solutions are already known that allow this function to be achieved.

In these known machines, the aforementioned transfer axis also determines the transport position and potential intermediate positions such as, for example, a windrowing position in the case of a mower or a swather.

Such agricultural machines are known for example from documents FR 2 384 431, EP 2 189 053 and EP 2 926 643.

A constructional variant of such machines, in which the transfer axis is a vertical axis (the transport position being obtained by folding toward the rear, parallel to the direction of forward travel), is known from document EP 0 679 327.

Documents FR 2 384 431 and EP 2 189 053 further disclose the presence of additional means which, in addition to causing the tool or the group of tools to pivot toward the rear, also cause it to lift off the ground when the pressure exerted by the obstacle is sufficient and persists despite the folding-back.

Similarly, and more specifically in relation to a mower, document EP 2 926 643 also discloses additional means leading to a lifting, but of the frontal part of the tool or of the group of tools only, which lifting is intended to make it easier to pass over the top of the obstacle, which is often small in size.

However, these known solutions for safety systems are complex in construction, require several different active components or else perform actions that are difficult to control with precision.

It is an object of the present invention to overcome at least the chief disadvantages mentioned hereinabove.

To that end, the invention proposes, for an agricultural machine of the type defined hereinabove, in which the safety device comprises at least one lifting means connected to the hitching support by a second articulation and to the tool or to the group of tools, or to the mounting arm, by a third articulation, planning that the first articulation directly connects the mounting arm to the hitching support, that the second articulation is offset relative to the direction of forward travel with respect to the first articulation, and that the safety movement may comprise a second phase of movement that is consecutive to the first phase and in which the lifting means is in an end-stop state in which, if the pressure persists in the context of this second phase of movement, it exerts on the tool or the group of tools considered an upwardly-directed force so as to distance said tool or group of tools considered from the ground.

The invention will be better understood by virtue of the following description, which relates to some preferred embodiments given by way of nonlimiting examples and explained with reference to the attached schematic drawings in which:

FIGS. 1A to 1D are views, respectively, in perspective (FIG. 1A), from the front (FIG. 1B—in the opposite direction to the direction of forward travel), from the right (FIG. 1C) and from above (FIG. 1D), of an agricultural machine according to the invention, in the form of a mower bar with rotary disks, in the normal working position (absence of obstacle), the accessories (hydraulic supply circuits, covers, cowling, drive, etc.) having been removed;

FIGS. 2A to 2C are views, respectively from the front (2A), from the right (2B) and from above (2C), of the agricultural machine depicted in FIG. 1, this machine being in the first phase of the safety movement under the pressure exerted by an obstacle on the ground (not depicted) (group of tools tilted rearward and with the front edge raised);

FIGS. 3A to 3C are views, respectively, from the front (3A), from the right (3B) and from above (3C), of the agricultural machine depicted in FIGS. 1 and 2, this machine being in the second phase of the safety movement under the pressure exerted by an obstacle on the ground, which has not been overcome at the end of the first phase of said movement (group of tools tilted rearward and raised off the ground, the front edge still being raised);

FIGS. 1 to 7 are a simplified illustration of an agricultural machine 1 moving normally in a direction of forward travel A during work, and comprising:

Figure 1A:
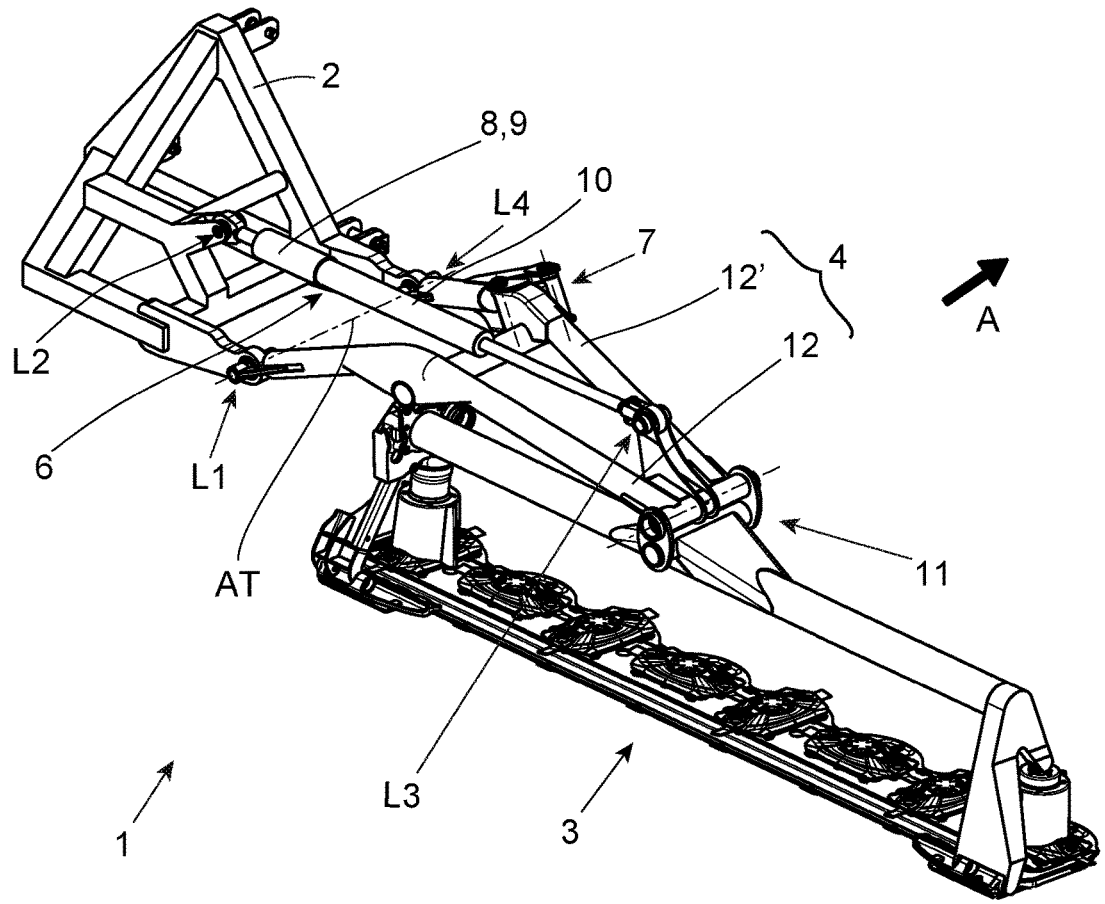
Figure 1B:
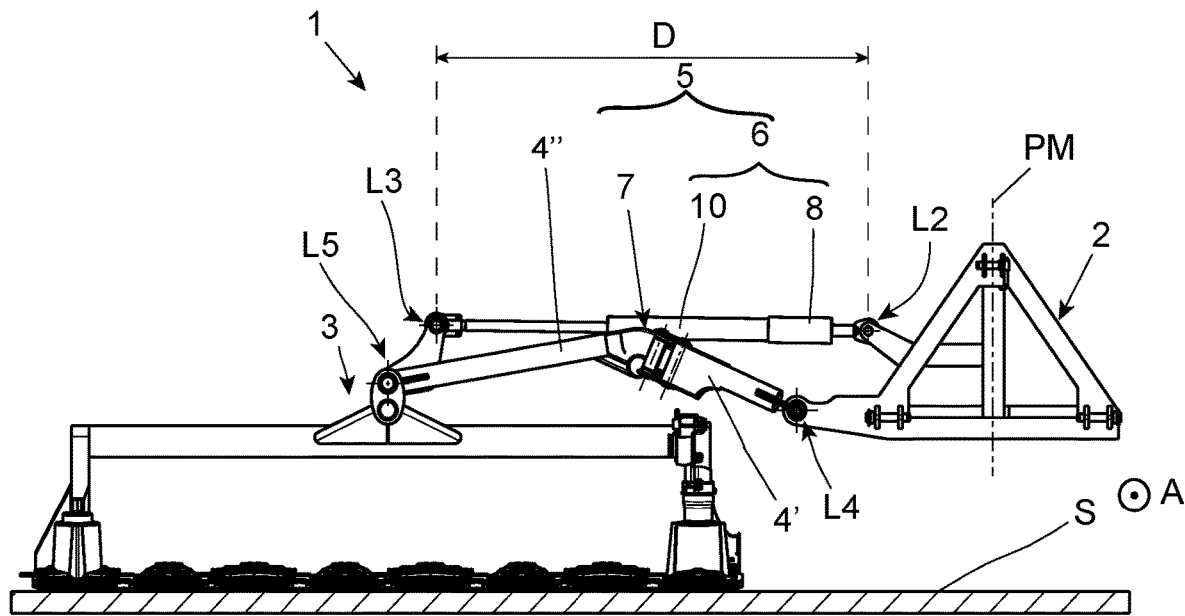
Figure 1C:
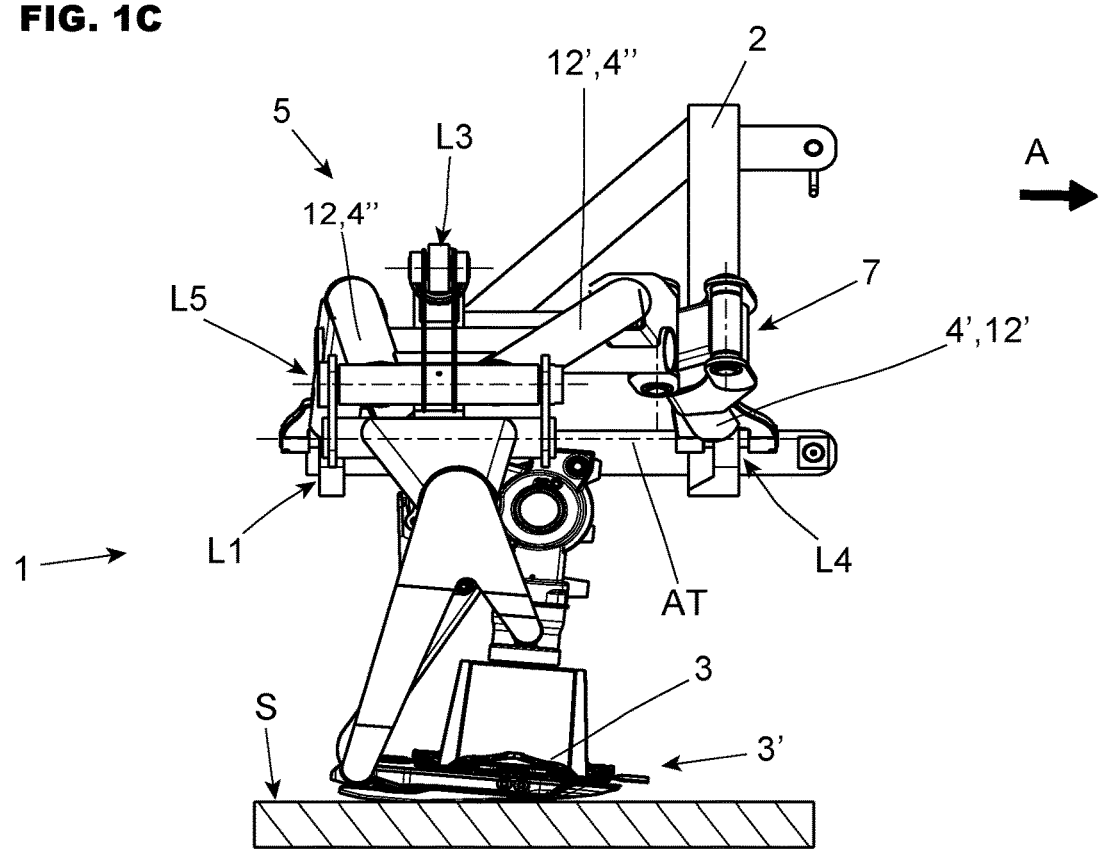

a hitching support 2, at least one tool or group of tools 3 having, in the work position, an extension transverse to the direction of forward travel A and projecting laterally with respect to the hitching support 2, at least one mounting arm 4 connected to the hitching support 2 via a first articulation L1, and to the tool or to the group of tools 3 considered, said mounting arm 1 being mounted with the ability to pivot about an axis AT referred to as the transfer axis, substantially parallel to the plane of the ground S when the machine 1 is hitched, and about which the tool or the group of tools 3 can be transferred alternately between a working position in which it at least partially rests on the ground S and at least one raised position, in which it is distanced from the ground S, a safety device 5 by means of which the tool or the group of tools 3 considered can perform a safety movement under the effect of sufficient pressure P exerted in an opposite direction to the direction of forward travel A, this safety movement comprising at least a first phase of movement of which at least one component is a rotation toward the rear, this being with respect to the direction of forward travel A, and about the first articulation L1.

Furthermore, said safety device 5 comprises a lifting means 6 connected to the hitching support 2 by a second articulation L2 and to the tool or to the group of tools 3, or to the mounting arm 4, by a third articulation L3. This lifting means 6 advantageously has a determined range of operation. Within this range, the lifting means 6 is positively active, and possibly controllable.

In addition, the second articulation L2 is offset relative to the direction of forward travel A with respect to the first articulation L1 and the first articulation L1 directly connects the mounting arm 4 to the hitching support 2.

Furthermore, the safety movement may comprise a second phase of movement that is consecutive to the first phase and in which the lifting means 6 is in an end-stop state in which, if the pressure P persists in the context of this second phase of movement, it exerts on the tool or the group of tools 3 considered an upwardly-directed force so as to distance said tool or group of tools 3 considered from the ground S. In addition, said tool or group of tools may potentially continue its rearward rotation (if the pressure P persists). The pressure P may be exerted on the tool or the group of tools 3 or on the mounting arm 4.

By virtue of the above measures, the invention proposes a simple, robust, economical and reliable solution for bringing about a safety clearance movement when the tool or the group of tools 3 encounters, as the machine is moving forward, an obstacle that it can neither move aside nor overcome in the normal working position.

By providing two phases of safety movement the invention makes it possible to provide a graduated response with two levels, in terms of action, for overcoming the obstacle while continuing to move forward, this being dependent on the significance (size, weight, resistance to being pulled out, etc.) of the obstacle encountered. In addition, by assigning it an additional function by exploiting a (constructively defined) specific state, this being in relation to an arrangement with a particular configuration in terms of positions and connections, the invention may advantageously, where appropriate, make use of a means that already exists on the machine 1 to contribute to achieving the second phase of the safety movement. Finally, the movement away from the ground is a direct and exclusive result of constructional arrangements (end-stop state, arrangement, structure, dimensions and fixing of the lifting means 6, etc.) and is achieved automatically and progressively from the moment at which the end-stop state is reached, and without the need for a command.

What is meant herein by an end-stop state is, in the case of a lifting means 6 that can be deformed or folded with a change (an increase or a decrease) to at least one dimension, a configuration reached by said means 6 at the end of the first phase of the safety movement and in which any additional modification in the same direction is rendered (physically) impossible, the means 6 then behaving like a connection element that is rigid and nondeformable with respect to an additional modification to said at least one dimension.

Thus, when the lifting means 6 reaches the end-stop state, the first phase of the safety movement comes to an end and the second phase of the safety movement begins. Furthermore, when the safety movement is in its second phase, the lifting means 6 is in an end-stop state. In the end-stop state, if the pressure P persists, the lifting means 6 exerts on the tool or the group of tools 3 considered an upwardly directed force or stress which allows said tool or group of tools 3 considered to be moved progressively away from the ground S in addition to potentially continuing to rotate this tool or group of tools rearward.

As a preference, the second articulation L2 is, in the normal working position, also offset relative to the ground S with respect to the first articulation L1.

Advantageously, the lifting means 6 is configured to, on the one hand, allow a variation in the distance D between the second and third articulations L2 and L3 over a determined range of lengths and, on the other hand, reach an end-stop state in which said distance D exhibits a maximum or minimum value, and in which said lifting means 6 exerts an upwardly directed force.

This upward stress (with respect to the plane of the ground) progressively causes the tool or the group of tools 3 to move away from the ground during the course of the second phase of the safety movement, in the event of the pressure P persisting and as the machine 1 advances.

The minimum or maximum value for the distance D is reached when the lifting means reaches its end-stop state, at the end of the first phase of the safety movement.

During the first phase of the safety movement, the lifting means 6 is in what is referred to as a slack state. In the slack state, the lifting means 6 allows a variation in the distance D between the second and third articulations L2 and L3 over a determined range of lengths.

In practice, the choice of lifting means 6 and the adjustment of its travel (the end of travel corresponding to the end-stop state) determine the circumstances that define the beginning of the second phase of the safety movement. The fact that the end-stop state is linked to the maximum admissible length of one element of the machine makes it possible reliably and simply to ensure that the tool or the group of tools 3 is moved away from the ground. An angle of inclination (pivoting about the articulation L1 when viewed from above) of around 5° to 15° of the tool or of the group of tools 3 (more specifically of between 10° and) 11° toward the rear with respect to a plane perpendicular to the direction of forward travel A, or its normal working position, constitutes a good compromise for the choice of the end of the first phase and the start of the second phase of the safety movement.

As a preference, the invention may plan that, when the tool or the group of tools 3 is in the working position, the distance D varies between, on the one hand, a minimum value corresponding to the normal working position of the tool or of the group of tools 3 and, on the other hand, a maximum value. This maximum value may be achieved at the end of the first phase or during the course of the second phase of the safety movement. In the normal working position, no obstacle is exerting sufficient pressure P on the tool or the group of tools 3 or on the mounting arm 4 to trigger the safety movement.

In order to ensure that the tool or the group of tools is kept in the normal working position, in collaboration with the first articulation L1, the mounting arm 4 is also advantageously connected directly to the hitching support 2 via a fourth articulation L4 offset forward with respect to the first articulation L1, in the direction of forward travel A. In addition, the fourth articulation L4 is offset downward toward the ground S, with respect to the second articulation L2. As a preference, the fourth articulation L4 is situated substantially the same distance away from the plane of the ground as the first articulation L1. As is apparent from the attached figures, the first articulation L1 connects the mounting arm 4 directly to the hitching support 2, and the fourth articulation L4 (which also directly connects the mounting arm 4 to the hitching support 2).

What is meant in the present document as a direct connection or assembly is an assembly between mounting arm 4 and hitching support 2 that has no additional intermediate component or element, namely other than the articulation L1 and, where appropriate, the fourth articulation L4. When the aforementioned two articulations are present, the direct articulated connection between the support 2 and the arm 4 consists in a pivot connection about the transfer axis AT.

According to a first embodiment variant, evident from FIGS. 1 to 7, the machine 1 may comprise, where appropriate for each mounting arm 4, a guide device 7 that allows a variation in the distance between the third articulation L3 or a free end 11 of the mounting arm 4, on the one hand, and the or a fourth articulation L4 that connects the mounting arm 4 to the hitching support 2, on the other hand. The free end 11 of the mounting arm 4 is situated at the opposite end to the hitching support 2. The lifting means 6 is connected to the tool or to the group of tools 3 or to the mounting arm 4 by the third articulation L3, which is offset toward the free end 11 of the arm 4.

According to a second embodiment variant that can be implemented as an alternative to or in combination with the aforementioned first variant, the machine 1 may comprise, where appropriate for each mounting arm 4, a guide device 7 allowing a variation in the distance between the first articulation L1, on the one hand, and the third articulation L3 or the free end 11 of the mounting arm 4, on the other hand.

By providing such a device 7, the mounting arm 4 has the ability to have an at least limited modification to its shape, allowing the two phases of the safety movement without compromising the prime functions of said arm 4, namely to support, hold in position, and move between the various illustrated operational positions, the tool or the group of tools 3.

The guide device 7 may also make it possible to limit the amplitude of the safety movement. When the second phase of the safety movement is reached, the tool or the group of tools 3 is in what is known as the triggered position.

According to one feature of the invention, that makes it possible to limit the number of articulated fixing points between the mounting arm 4 and the hitching support 2, the invention may plan for the transfer axis AT to pass through the first articulation L1.

According to a preferred construction, the transfer axis AT is defined by collaboration between the first and fourth articulations L1 and L4, or in other words, said articulations L1 and L4 together define said axis AT. It is then fixed with respect to the hitching support 2. This hitching support 2 is intended to be connected to a tractor or similar vehicle, not depicted.

Thus, these two articulations L1 and L4 guide both the safety movement and the transfer movements between the working position on the ground and one of the other predetermined positions away from the ground (transport position, windrowing position).

As shown by the attached figures, the machine 1 comprises at least a first cylinder 8 for keeping the tool or the group of tools 3 in the normal working position in a controlled manner, this first cylinder 8 allowing the tool or the group of tools 3 to perform the first phase of the safety movement. Said first cylinder 8 may allow the tool or the group of tools 3 to perform the first phase of the safety movement, freely, or preferably while applying a predetermined resistive stress counter to said safety movement, this first cylinder 8 forming part of the safety device 5. In the latter case, the end-of-travel position defines the end-stop state (no need for a specific end stop) and the entirety of the travel of the first cylinder 8 is exploited. The first cylinder 8 thus generates the resistive stress that keeps the tool or the group of tools 3 in the normal working position. This amounts to stating that the first cylinder 8 generates the resistive stress that keeps the distance D at its minimum value.

Advantageously, the second articulation L2 is, in the normal working position, offset forward, relative to the direction of forward travel A, and upward, away from the ground S, with respect to the first articulation L1. In addition, the lifting means 6 in the end-stop state may advantageously be a tie capable of transmitting a pulling force between the tool or the group of tools 3, on the one hand, and the hitching support 2, on the other hand (preferably right from the start of the second phase of the safety movement).

Such a design is advantageous because it minimizes the overall bulk of the machine 1, because it avoids shifting the center of gravity of the machine 1 toward the rear, and because it makes it possible to maintain a certain ground clearance corresponding to the distance between the machine 1 and the ground S in the windrowing position (in the case of a mowing or haymaking machine for example).

Figure 6:
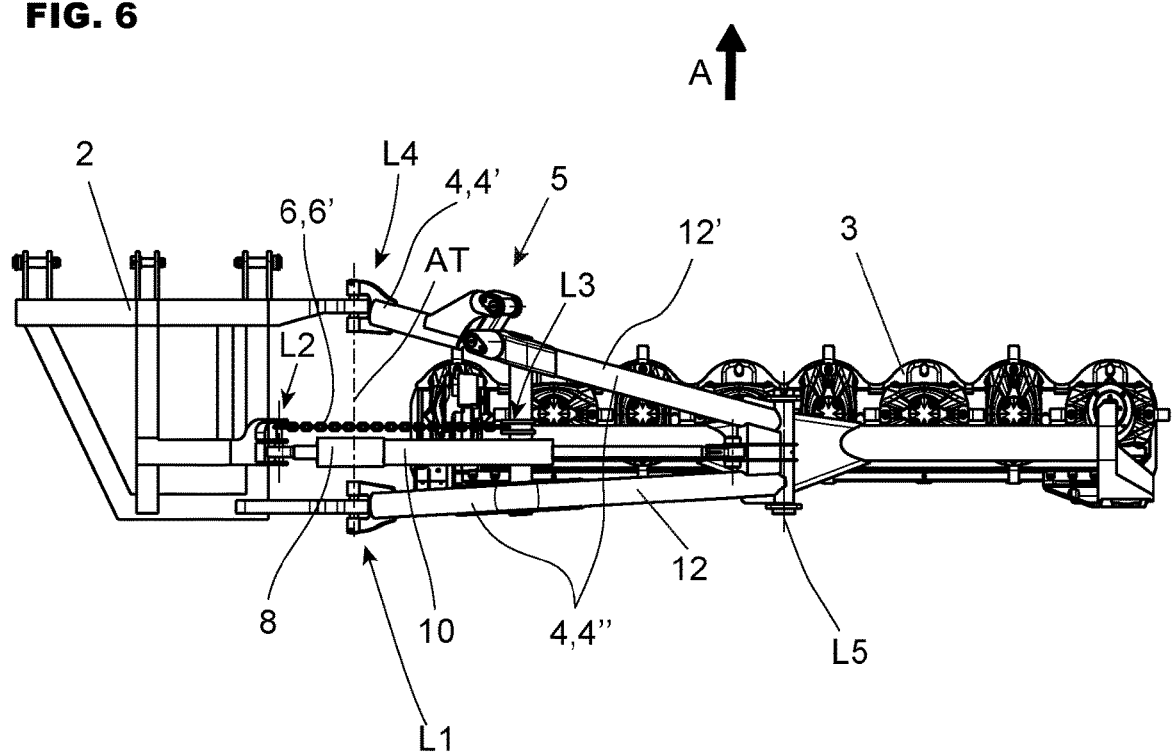
FIGS. 6 and 7 are views from above of an agricultural machine of the type depicted in FIGS. 1 to 5, equipped with a variant embodiment of the lifting means, depicted in the normal working position.

The safety device 5 may thus comprise either the first cylinder 8 (designed and arranged to be in an end-stop state at the end of the first phase of the safety movement—FIGS. 1 to 5 and FIG. 7), or a connecting means 6' of the chain, cable or similar type (FIG. 6—designed and arranged to be in an inextensible state at the end of the first phase of the safety movement). The end of the first phase of the movement corresponds to the distance D between the second and third articulations L2 and L3 during the course of the safety movement reaching its maximum value. Whether the lifting means 6 comprises the first cylinder 8 or a connecting means 6', it is relaxed and/or unable to transmit a pulling force in the normal working position and during the first phase of the safety movement.

Such a tie of the passive type (connecting means) may be mounted in parallel with a second, raising, cylinder 10, without necessarily being fixed by the same articulations or sites to the mounting arm 4 and/or to the hitching support 2.

By using the first cylinder 8 as lifting means 6, the invention allows the safety device 5 to be reset remotely (from the towing vehicle, not depicted) (using a hydraulic pressure control).

Furthermore, given the arrangement of the lifting means 5 (relative arrangement of the articulations L2 and L3 with respect to the articulations L1 and L4), the safety device 5 is situated essentially above the mounting arm 4 and above the tool or the group of tools 3.

In order to enjoy a certain freedom in the guided path of the tool or of the group of tools 3, and thus allow the simultaneous combination of several elementary movements, during the two phases of the safety movement, while at the same time limiting the number of articulations and allowing said tool or group of tools to move toward and from the other functional positions (transport position, windrowing position, triggered position), it may advantageously be planned for each of the first, second and fourth articulations L1, L2 and L4 to allow, on the one hand, at least a limited rotation about an axis substantially parallel to the plane of the ground S and substantially parallel to the direction of forward travel A and, on the other hand, at least a limited rotation about an axis substantially perpendicular to the plane of the ground S.

Figure 1D:
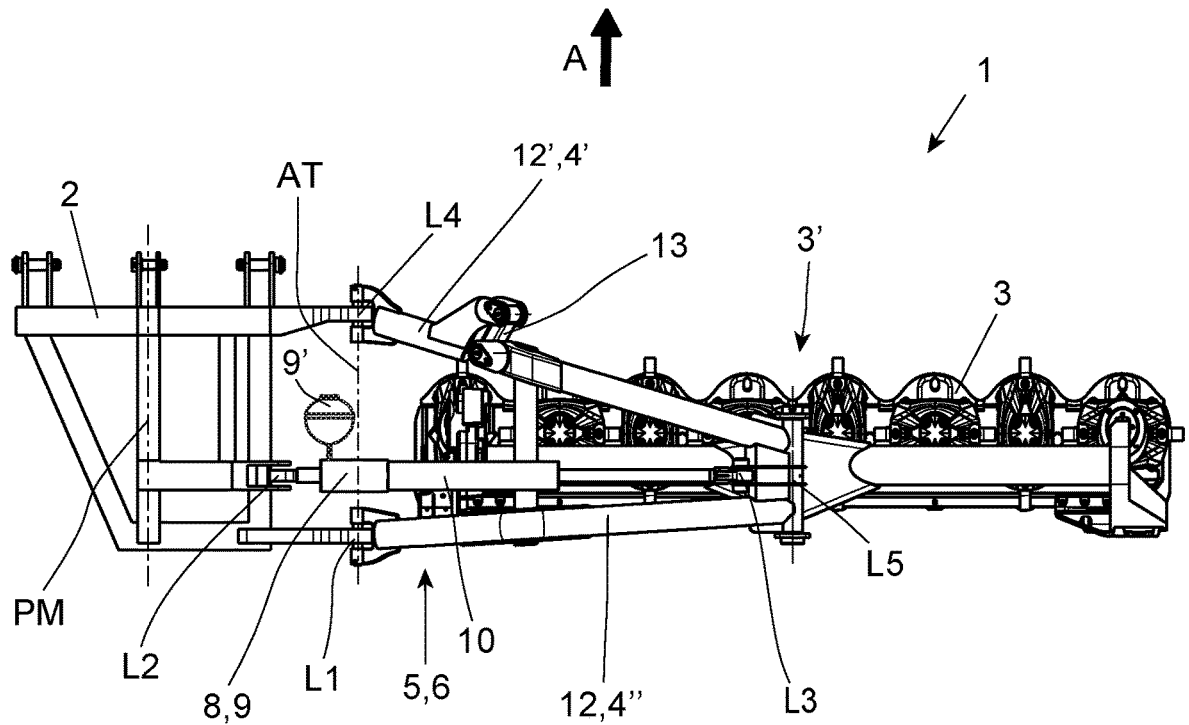
Figure 2A:
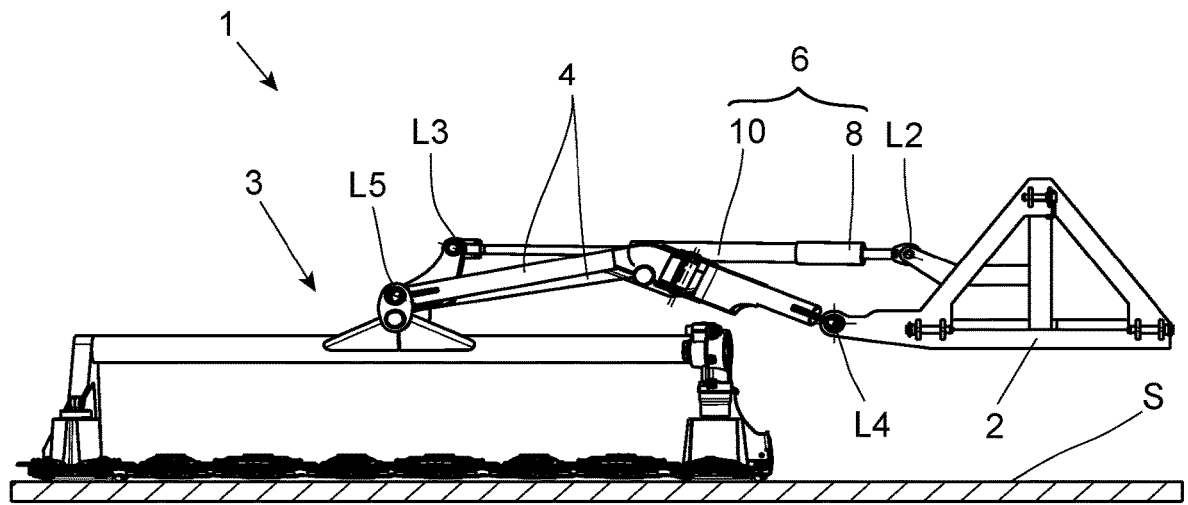
Figure 2B:
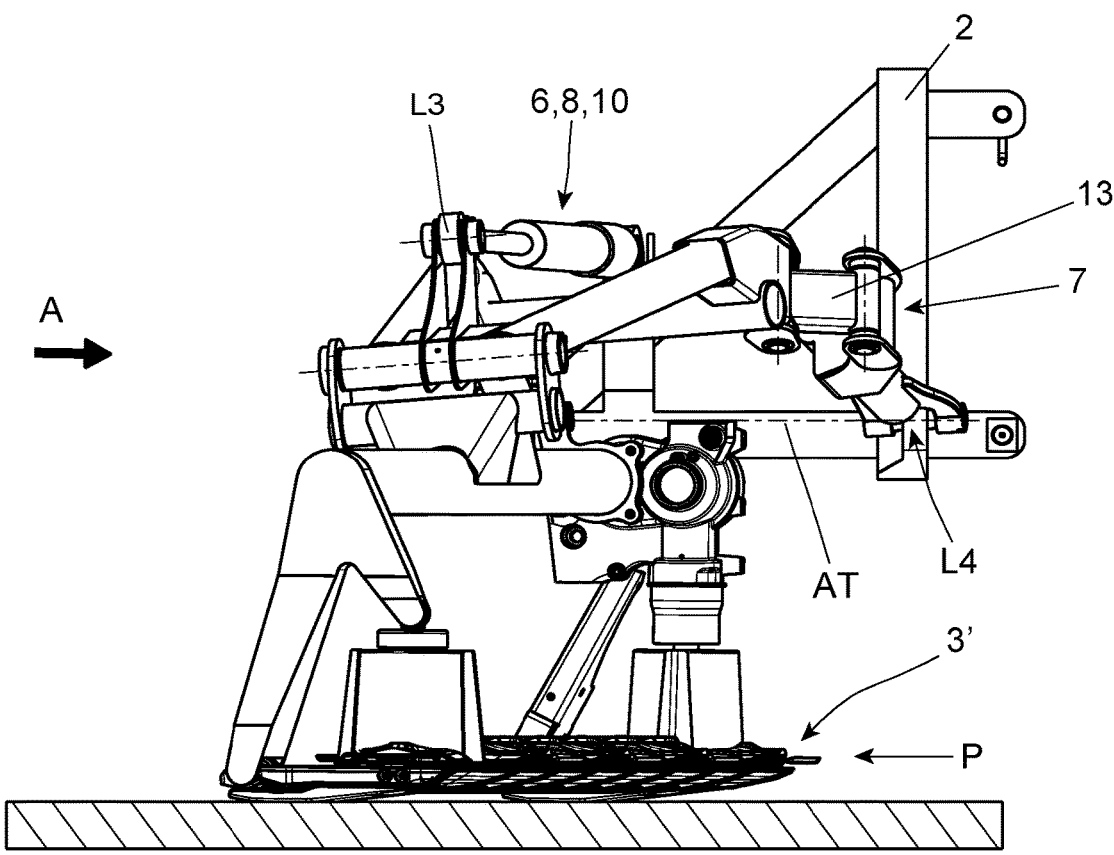
Figure 2C:
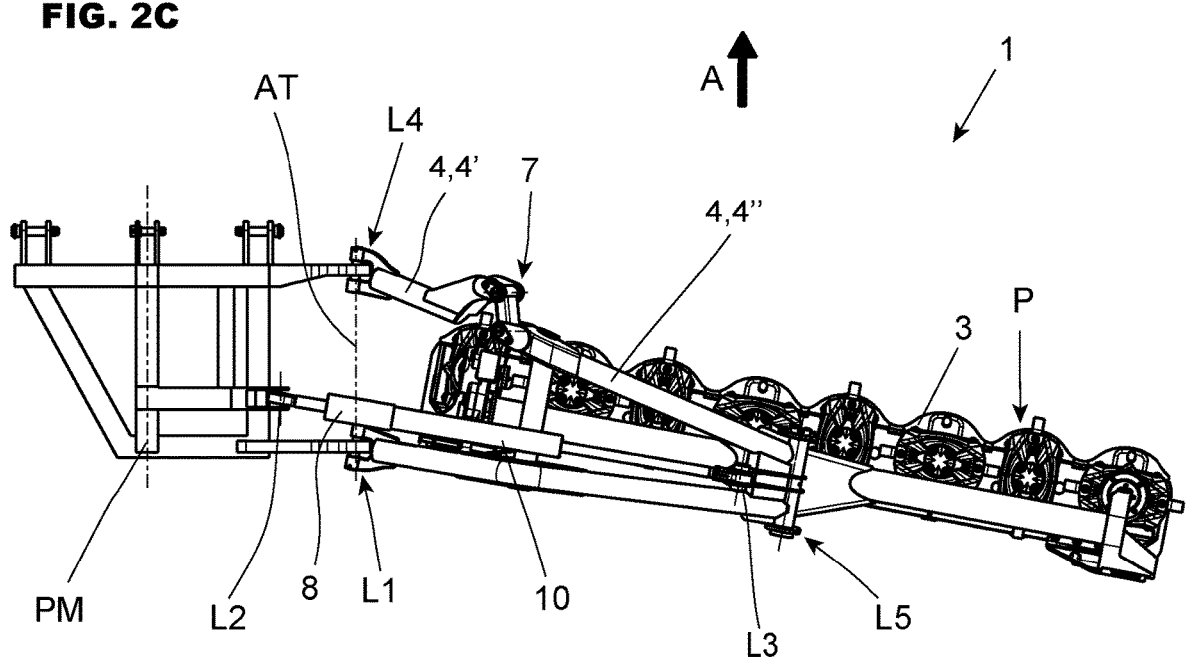

As is evident from comparing FIGS. 1 and 2, and more particularly in connection with a machine 1 equipped with a tool or with a group of tools 3 that is inclined forward in the normal working position (nose-down), provision may be made for the device 7 for guiding the or a mounting arm 4 considered to be configured to exert a force on the front of the tool or of the group of tools 3, so as to tilt it upward by rotation about the first articulation L1, and to do so already during the first phase of the safety movement.

Such an arrangement (automatically forcing an upward pivoting) of course encourages the tool or the group of tools 3 to pass over small-sized protruding obstacles, during the first phase of the safety movement (FIG. 2).

As a preference, the guide device 7 (for example of the toggle-joint type with two parallel pivot pins) is actively kept in the folded position under the effect of a controlled stress supplied by the first cylinder 8 (and/or by another additional cylinder 14), that also keeps the tool or the group of tools 3 in the normal working position.

As also shown by the attached figures, the second articulation L2 is situated closer to a midplane PM of the hitching support 2, perpendicular to the plane of the ground S and parallel to the direction of forward travel A, than the first articulation L1. As a preference, each of the first, second and fourth articulations L1, L2 and L4 is a ball-jointed articulation. Such a design of the machine 1 advantageously allows the mounting arm 4 to accompany the upward tilting of the front of the tool or of the group of tools 3 as it pivots about the first articulation L1.

However, as a variant (not depicted), the articulations L1 and L4 at least may be produced in the form of universal joints (with spiders), their vertical axes then being parallel to the two axes of pivoting of the toggle joints that constitute the guide device 7. This variant nevertheless does not allow the upward pivoting of the front of the tool or of the group of tools 3 during the safety movement.

Figure 3A:
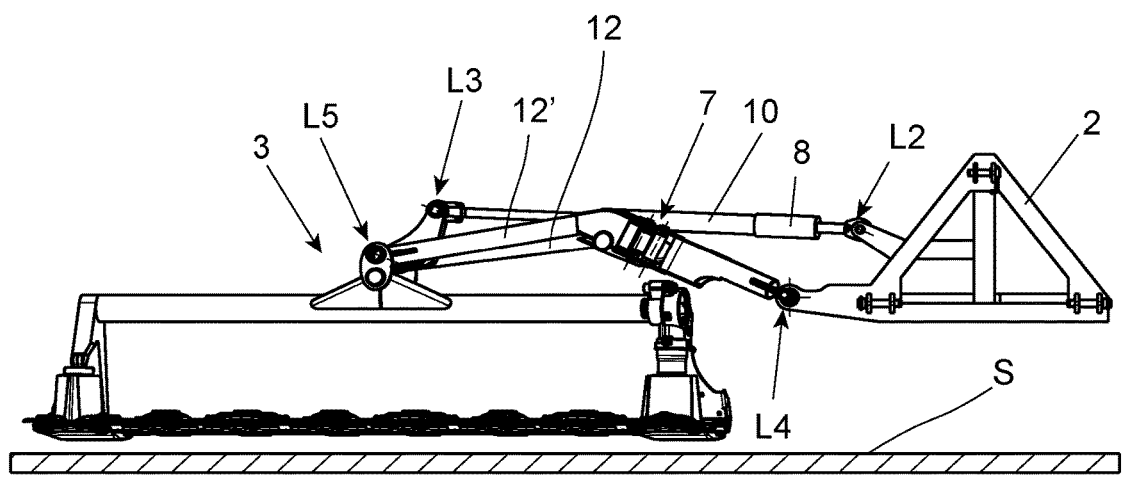
Figure 3B:
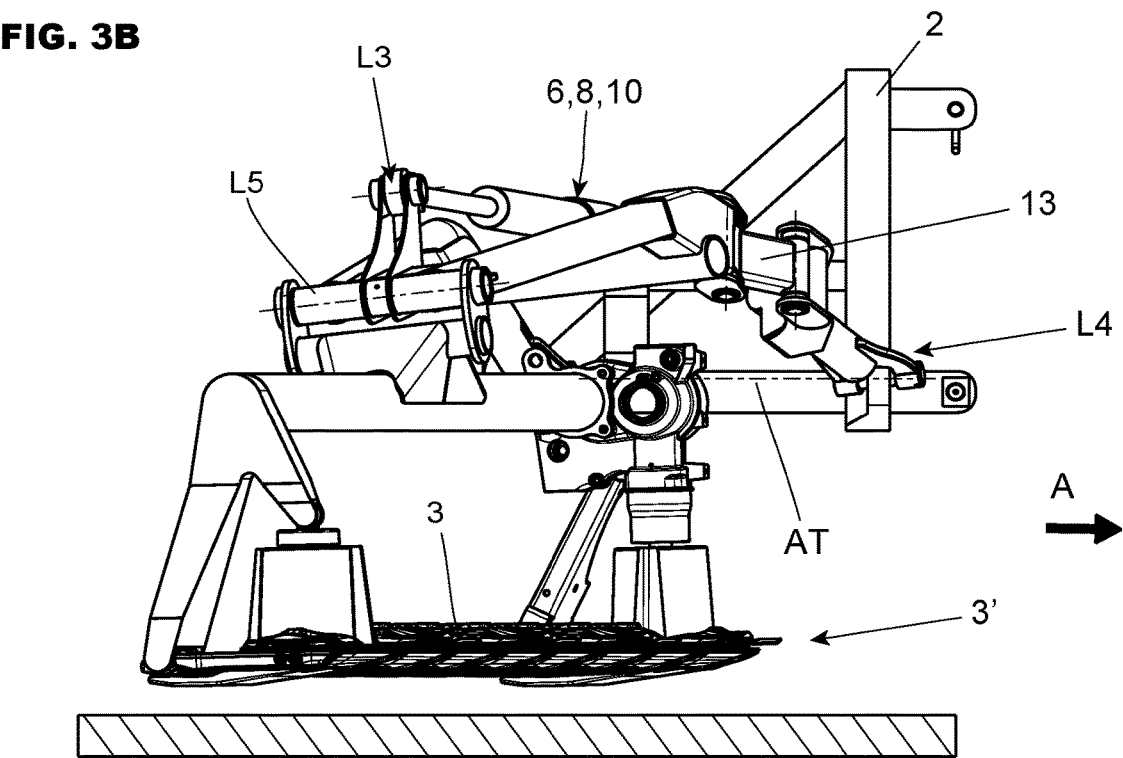
Figure 3C:
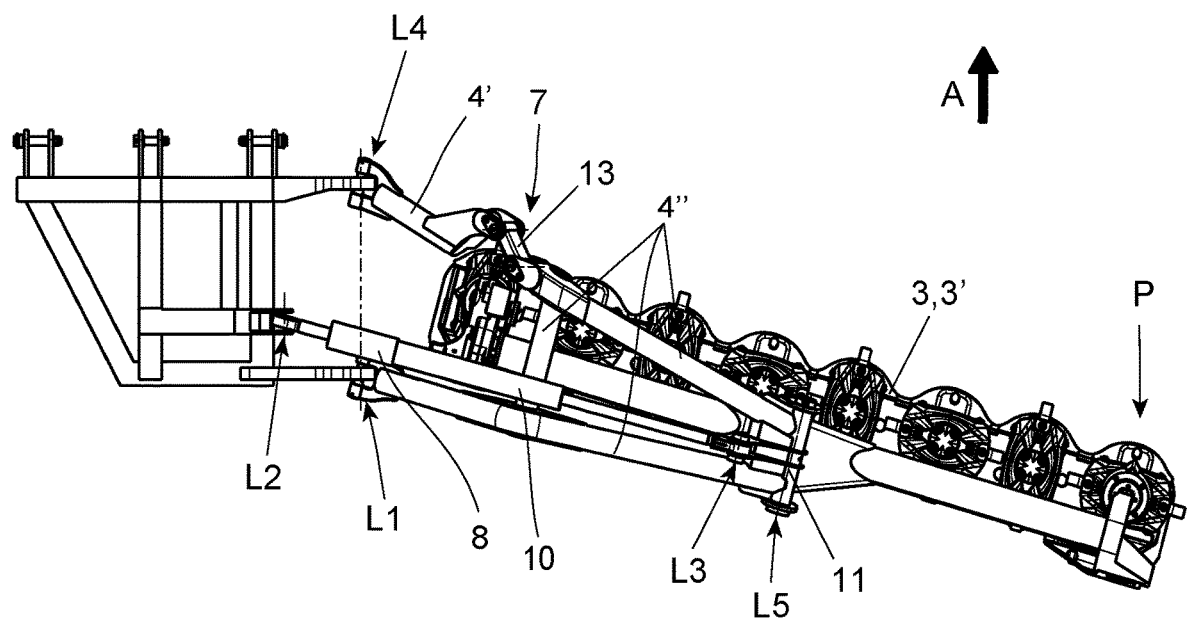
Figure 4:
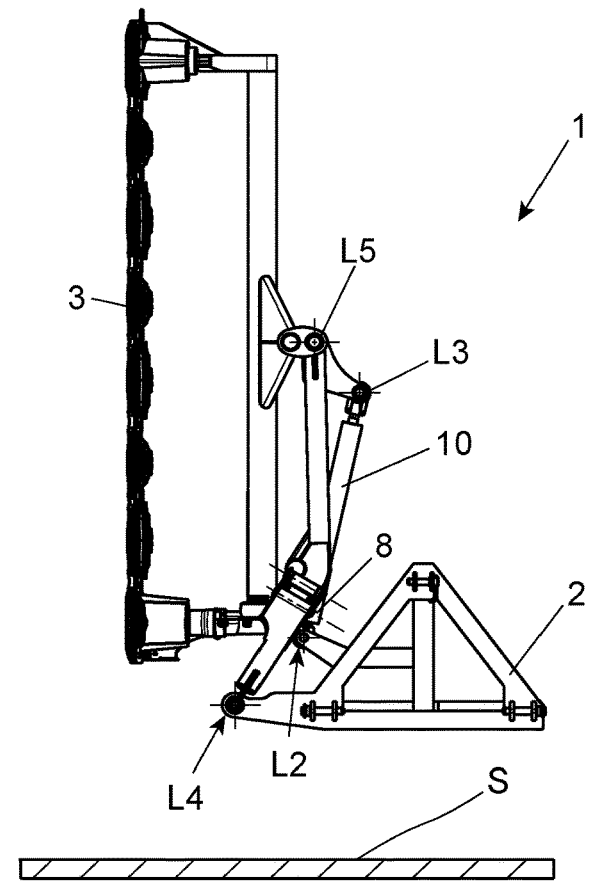
FIG. 4 is a view from the front of the agricultural machine of FIGS. 1 to 3 in the raised transport position.
Figure 5:
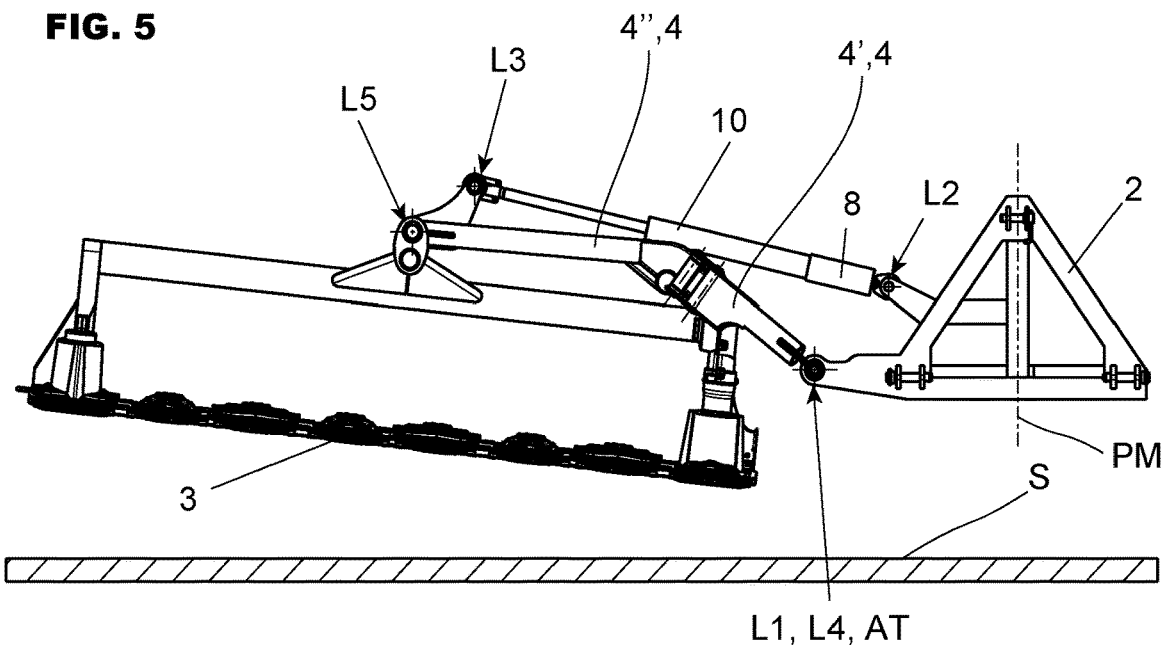
FIG. 5 is a view from the front of the agricultural machine of FIGS. 1 to 4 in the so-called windrowing position.

In connection with FIGS. 1 to 3, it may be noted that the two successive phases of the safety movement take the following form:

The first phase comprises a component of rotation with respect to the hitching support 2 toward the rear about the first articulation L1. It comprises a pivoting about a vertical axis passing through L1. It also comprises a pivoting about an axis that is horizontal or parallel to the ground S, transverse to the direction of forward travel A and passing through L1, and it may also comprise a component of pivoting upward about the transfer axis AT.

The second phase for its part comprises a pivoting about a vertical axis passing through L1, and a pivoting about an axis passing through L1 and L2.

It will also be noted that the lifting means 6 forces the entirety of the tool or of the group of tools 3 to perform a pivoting about the axis passing through L1 and L2.

In addition, during the safety movement, the tool or the group of tools 3 performs a rotation together with at least part of the mounting arm 4. In general, the tool or the group of tools 3 performs the safety movement with respect to the hitching support 2 together with the mounting arm 4. As is evident from FIGS. 2 and 3, the tool or the group of tools 3 performs the safety movement together with the lifting means 6.

In order to adapt the position of the tool or of the group of tools 3 to suit the unevennesses of the terrain, the machine 1 may comprise a load-lightening means 9 relieving part of the force with which the tool or the group of tools 3 bears against the ground, said load-lightening means 9 advantageously consisting of an energy accumulator.

In order to limit unwanted triggerings of the safety device 5 and minimize the number of cylinders employed, provision is advantageously made for the first cylinder 8 that forms part of the lifting means 6 or that alone constitutes said means, to be connected to a pressure accumulator 9' in order to constitute the load-lightening means 9 (FIG. 1D).

In that case, the first cylinder 8 and, where appropriate, the load-lightening means 9, ensures that the tool or the group of tools 3 is kept in the normal working position, provides the resistive force that has to be overcome in order to trigger the first phase of the safety movement, and acts as a tie at the end of travel in order to automatically lift the tool or the group of tools 3 during the second phase of the safety movement, by movement about the ball-jointed connection that forms the first articulation L1. In addition, the load-lightening means 9 also makes it possible to reduce the force with which the tool or the group of tools 3 presses down on the ground, as the distance D between the second and third articulations L1 and L3 lengthens, thus making it easier to pass over small-sized obstacles without the need to trigger the second phase of the safety movement. In other words, during the first phase of the safety movement, made up of at least a rearward rotation about the first articulation L1 of the tool or of the group of tools 3 with respect to the hitching support 2, the load-lightening means 9 generates an upwardly directed torque on the arm 4 and about the transfer axis AT without necessarily separating the tool or the group of tools 3 from the ground S.

In order to be able to ensure the movement of the tool or of the group of tools 3 between the various customary positions needed for correct operation and transport of the machine 1, the latter comprises, where appropriate for each tool or group of tools 3, a second cylinder 10 known as the raising cylinder, configured to transfer the tool or the group of tools 3 considered alternately between the working position and at least one intermediate or final raised position, by pivoting about the transfer axis AT.

For preference, and in accordance with an embodiment that is practical, simple, and not very bulky, the second cylinder 10, or raising cylinder, is constructionally associated with the lifting means 6 and is advantageously secured to and arranged coaxially in the extension of the first cylinder 8 that forms parts of said lifting means 6 and configured to be, at the end of the first phase of the safety movement, in a lengthened end-stop state.

According to one preferred embodiment of the invention that is evident from FIGS. 1 to 7, the or each mounting arm 4 comprises a first front constituent part 4' directly connected to the hitching support 2 by a or the fourth articulation L4 and a second rear constituent part 4" connected directly to the hitching support 2 by the first articulation L1, said first and second constituent parts 4' and 4" being connected to one another by the or a guide device 7. In this embodiment, the second part 4" comprises the free end 11 of the mounting arm 4, and the third articulation L3.

In a variant, provision may also be made for the first front part 4', connected to the hitching support 4 by the articulation L4, to comprise the free end 11 and the articulation L3, to the detriment of the second rear part 4", connected to the hitching support 2 by the articulation L1.

Whichever is the constituent part of the arm 4 that bears the free end 11 and the articulation L3, the guide device 7 allows the mounting arm 4 to deform, so as to allow the mounting arm 4 to effect a rotation about L1 without moving the fourth articulation L4, this deformation allowing the part 4' to be misaligned from the part 4". As a preference, this deformation makes it possible to form an angle (other than 180°) between the part 4' and the part 4".

More specifically, and according to an advantageous constructional variant evident from FIGS. 1 to 7, the or each mounting arm 4 may have an A-shaped structure of which the vertex is connected to the tool or to the group of tools 3, for example via a fifth articulation L5, and of which the two legs 12 and 12' are connected, at their opposite ends from the vertex, to the hitching support 2 by the first articulation L1 and by the or a fourth articulation L4, respectively.

As described above, the guide device 7 may be incorporated either into the front leg 12' (FIGS. 1 to 7) or into the rear leg 12 of the A-shaped structure.

In the attached figures, these two legs 12 and 12' are rigidly connected by a crossmember. Of course, several crossmembers (or any other means of rigid attachment) may be envisioned.

Such a structure of mounting arm 4 is more particularly described and illustrated in French patent application No. 1760994 of Nov. 21, 2017, in the name of the Applicant Company, the various embodiment variants that form the subject matter of that patent application and, more generally, the entirety of the content thereof, being incorporated by reference into the present.

As is evident from the attached figures, the articulation L5 is, for example, a pivot connection with an axis substantially parallel to the direction of forward travel A in the normal working position (absence of sufficient pressure P to move the group of tools 3 toward the rear—group of tools 3 extending in a direction substantially perpendicular to the midplane PM—FIG. 1), achieving a pendular attachment of the tools 3.

Furthermore, the articulation L3 is situated above the mounting arm 4 such that the first cylinder 8 and second cylinder 10 are also positioned a pronounced distance above said arm 4.

The tool or the group of tools 3 may for example comprise or consist of a conditioner or a conveyor.

The machine 1 may be of the mounted, semimounted or drawn type. In the latter two instances, a wheelset supports at least part of the weight of the machine 1. In order notably to be able simply to provide a stress that causes the upward tilting of the front edge of the tool or of the group of tools 3, using the rearward pivoting movement about the first articulation L1 during the first phase of the safety movement, provision may, as shown in the attached FIGS. 1 to 5, be made for the two legs 12 and 12' each to have a curved or bowed shape, with portions that rise and fall with respect to the plane containing the two outer ends of said legs 12 and 12' and the vertex of the A-shaped structure, the guide device 7 being incorporated into one of said portions, this being dependent on the desired variation in distance.

According to a first variant evident from FIGS. 1 to 5, the guide device 7 consists of a mechanism of the toggle joint or scissors stay type comprising a link rod 13 connected in an articulated manner to or to the two constituent parts 4' and 4" of the mounting arm 4 considered using pivot connections with parallel axes.

Figure 7:
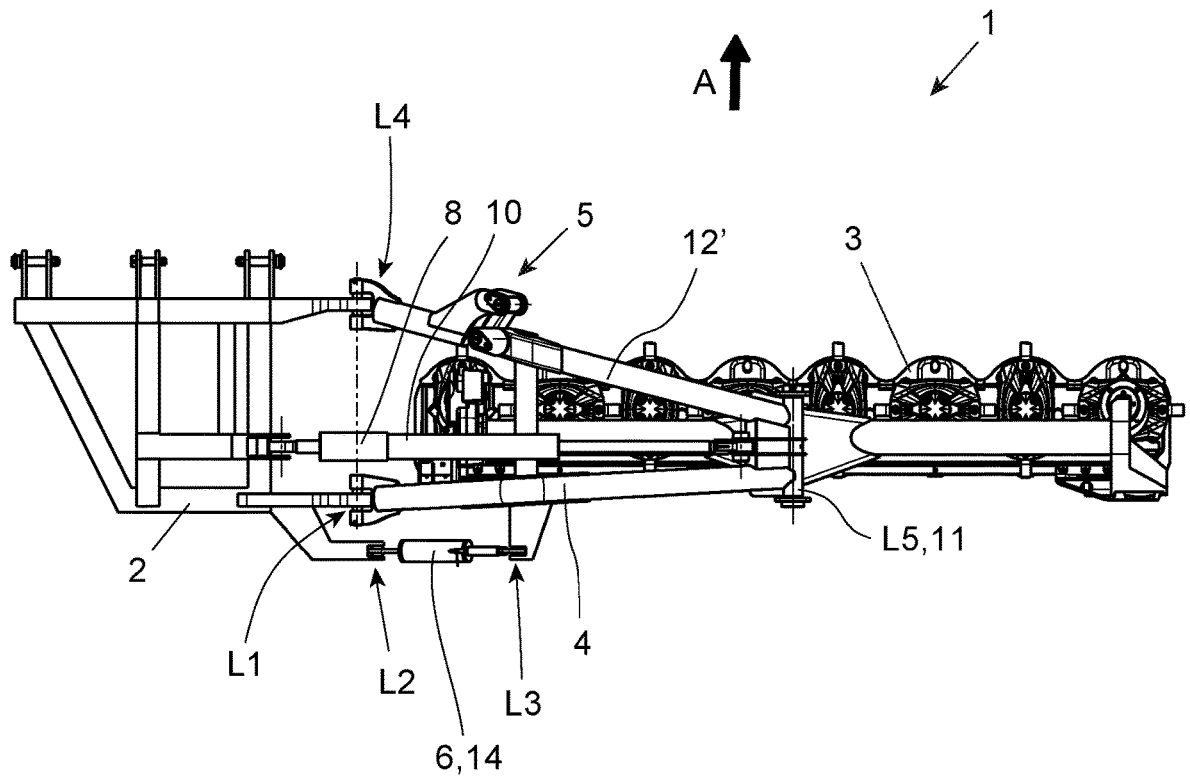

In another alternative embodiment variant depicted in FIG. 7, the second articulation L2 is offset toward the rear, relative to the direction of forward travel A, and downward, closer to the ground S, with respect to the first articulation L1. In addition, the second articulation L2 is situated further away from the midplane PM than the first articulation L1. The lifting means 6 may then comprise, or else consist of, a thrusting additional cylinder 14 exerting a torque forward and upward about the articulation L1 so as to keep the tool or the group of tools 3 in a normal working position. The end-stop state of the lifting means 6 is then reached when the additional cylinder 14 is retracted all the way to the end of its travel. This additional cylinder 14 may also make it possible to increase the lightening of the load during the safety movement.

In the context of this other variant, the third articulation L3 is advantageously situated (in the working position with respect to the plane of the ground) above the second articulation L2, whereas in the variants of FIGS. 1 to 6 it is the articulation L2 that is advantageously situated above the articulation L3.

Although FIGS. 1 to 7 show a machine 1 with just one tool or group of tools 3, said machine 1 may of course comprise two tools or groups of tools 3 arranged on either side of the hitching support 2, preferably of identical forms and arranged symmetrically (with respect to the midplane PM), each one connected to the hitching support 2 by its own mounting arm 4 and each one associated with a safety device 5.

In connection with a preferred application of the invention, the tool or the group of tools 3 consists of a mowing member or member for treating cut plant matter, or a group of such members, attached by means of a pivot connection L5, forming a or the fifth articulation with an axis substantially parallel to the direction of forward travel A in the normal working position, to the free end 11 of the support arm 4 which is the opposite end to the hitching support 2, said machine 1 being of the mounted or drawn type.

Of course, the invention is not restricted to the embodiments described and depicted in the attached drawings. Modifications remain possible, notably from the viewpoint of the makeup of the various elements or through substitution of technical equivalents, without thereby departing from the field of protection of the invention.

The invention claimed is:

1. An agricultural machine that moves in a direction of forward travel during work, the machine comprising:
a hitching support;
at least one tool or group of tools having, in a work position, an extension transverse to the direction of forward travel and projecting laterally with respect to the hitching support;

a mounting arm connected to the hitching support via a first articulation and a fourth articulation offset forward with respect to the first articulation, in the direction of forward travel, and the mounting arm is connected to the tool or to the group of tools, the mounting arm being mounted to pivot about a transfer axis, substantially parallel to a plane of a ground when the machine is hitched, and about which the tool or the group of tools are configured to be transferred alternately between the work position in which it at least partially rests on the ground and at least one raised position, in which it is distanced from the ground; and a safety device by which the tool or the group of tools perform a safety movement under sufficient pressure exerted on the tool or group of tools in an opposite direction to the direction of forward travel, the safety movement comprising at least a first phase of movement of which at least one component is rotated toward the rear with respect to the direction of forward travel, and about the first articulation, wherein the safety device comprises lifting means connected to the hitching support by a second articulation and to the tool or to the group of tools, or to the mounting arm, by a third articulation, wherein the first articulation directly connects the mounting arm to the hitching support, wherein the second articulation is offset relative to the direction of forward travel with respect to the first articulation, wherein the lifting means is configured to allow a variation in the distance between the second and third articulations over a determined range of lengths and to reach an end-stop state in which the distance exhibits a maximum or minimum value, and in which the lifting means exerts an upwardly directed force, wherein each of the first, second and fourth articulations allows at least a limited rotation about an axis substantially parallel to the plane of the ground and substantially parallel to the direction of forward travel, wherein each of the first, second and fourth articulations allows at least a limited rotation about an axis substantially perpendicular to the plane of the ground, and wherein the safety movement comprises a second phase of movement that is consecutive to the first phase and in which the lifting means is in the end-stop state in which, when the pressure persists in the second phase of movement, the lifting means exerts on the tool or the group of tools an upwardly-directed force so as to distance the tool or group of tools from the ground.

2. The machine as claimed in claim 1, wherein the transfer axis passes through the first articulation.

3. The machine as claimed in claim 1, wherein the fourth articulation is offset downward toward the ground with respect to the second articulation.

4. The machine as claimed in claim 3, wherein the first articulation and the fourth articulation together define the transfer axis.

5. The machine as claimed in claim 1, further comprising at least a first cylinder for keeping the tool or the group of tools in the work position in a controlled manner, the first cylinder allowing the tool or the group of tools to perform the first phase of the safety movement.

6. The machine as claimed in claim 1, wherein the second articulation is, in the work position, offset forward, relative to the direction of forward travel, and upward, away from the ground, with respect to the first articulation, and the lifting means in the end-stop state is a tie to transmit a pulling force between the tool or group of tools and the hitching support.

7. The machine as claimed in claim 1, wherein the safety device comprises either a first cylinder or a connecting means comprising a chain or cable type.

8. The machine as claimed in claim 1, further comprising a guide device at the mounting arm that is configured to exert a force on the front of the tool or the group of tools so as to tilt the tool or the group of tools upward by rotation about the first articulation during the first phase of the safety movement.

9. The machine as claimed in claim 1, wherein the second articulation is situated closer to a midplane of the hitching support, perpendicular to the plane of the ground and parallel to the direction of forward travel, than the first articulation, and each of the first, second and fourth articulations is a ball jointed articulation.

10. The machine as claimed in claim 1, further comprising for each of the at least one tool or group of tools a raising cylinder configured to transfer the at least one tool or the group of tools alternately between the work position and at least one intermediate or final raised position, by pivoting about the transfer axis, and the raising cylinder is structurally associated with the lifting means and is secured to and arranged coaxially in the extension of a first cylinder that forms part of the lifting means and configured to be in a lengthened end-stop state at the end of the first phase of the safety movement.

11. The machine as claimed in claim 1, further comprising two tools or groups of tools arranged on either side of the hitching support, and each of the two tools or groups of tools is connected to the hitching support by its own mounting arm and associated with a safety device.

12. The machine as claimed in claim 11, wherein the two tools or groups of tools are of identical form and arranged symmetrically with respect to a midplane of the hitching support.

13. The machine as claimed in claim 1, wherein the at least one tool or the group of tools includes a member for mowing or treating cut plant matter, or a group of such members, attached by a pivot connection that forms a fifth articulation with an axis substantially parallel to the direction of forward travel in the work position, at the free end of the support arm that is the opposite end to the hitching support, the machine being of the mounted or drawn type.

* * * * *